United States Patent
Barroso et al.

(10) Patent No.: US 9,910,883 B2
(45) Date of Patent: Mar. 6, 2018

(54) ENHANCED BATCH UPDATES ON RECORDS AND RELATED RECORDS SYSTEM AND METHOD

(71) Applicant: International Business Machines Corporation, Armonk, NY (US)

(72) Inventors: Filipe J. Barroso, Medford, MA (US); Judith H. Cass, Hudson, MA (US); Marlin R. Deckert, San Jose, CA (US); Michael J. Saylor, Carlisle, MA (US); Adam Skwersky, Marlborough, MA (US)

(73) Assignee: International Business Machines Corporation, Armonk, NY (US)

(*) Notice: Subject to any disclaimer, the term of this patent is extended or adjusted under 35 U.S.C. 154(b) by 145 days.

(21) Appl. No.: 14/246,350

(22) Filed: Apr. 7, 2014

(65) Prior Publication Data
US 2015/0286641 A1    Oct. 8, 2015

(51) Int. Cl.
G06F 17/30    (2006.01)
G06F 17/24    (2006.01)

(52) U.S. Cl.
CPC ........ G06F 17/3038 (2013.01); G06F 17/248 (2013.01); G06F 17/30345 (2013.01); G06F 17/30365 (2013.01)

(58) Field of Classification Search
CPC .............. G06F 17/3038; G06F 17/30345
See application file for complete search history.

(56) References Cited

U.S. PATENT DOCUMENTS

| | | | |
|---|---|---|---|
| 5,982,890 A | 11/1999 | Akatsu | |
| 6,189,016 B1 | 2/2001 | Cabrera et al. | |
| 6,883,136 B1* | 4/2005 | Weinberg | G06F 17/245 715/205 |
| 7,249,140 B1 | 7/2007 | Korenevsky et al. | |
| 7,409,398 B1 | 8/2008 | Flam et al. | |
| 8,195,606 B2 | 6/2012 | Lu et al. | |
| 8,789,913 B2 | 7/2014 | Lloyd | |
| 2004/0230580 A1 | 11/2004 | Li et al. | |
| 2005/0033777 A1 | 2/2005 | Moraes et al. | |
| 2005/0262072 A1* | 11/2005 | Chen | G06F 17/3051 707/999.004 |
| 2005/0273697 A1 | 12/2005 | Weinberg et al. | |

(Continued)

FOREIGN PATENT DOCUMENTS

| | | |
|---|---|---|
| WO | 2005072047 A2 | 11/2005 |
| WO | 2013029817 A1 | 3/2013 |

OTHER PUBLICATIONS

List of IBM Patents or Patent Applications to be Treated as Related, dated May 4, 2015, pp. 1-2.

(Continued)

*Primary Examiner* — Khanh Pham
(74) *Attorney, Agent, or Firm* — Brian J. Colandreo, Esq.; Jeffrey T. Placker, Esq.; Holland & Knight LLP

(57) ABSTRACT

A method, computer program product, and computer system for receiving, by a computing device, a selection of a set of records to edit in a multi-record update operation. A selection is received of at least one record of the set of records on which to capture one or more changes. At least one aspect of the at least one record of the set of records is captured. The at least one aspect is played back on one or more remaining records of the set of records.

7 Claims, 5 Drawing Sheets

(56) References Cited

U.S. PATENT DOCUMENTS

| | | | |
|---|---|---|---|
| 2006/0174054 A1* | 8/2006 | Matsuki | G06F 3/0482 711/100 |
| 2006/0190487 A1 | 8/2006 | Hicks et al. | |
| 2007/0050174 A1 | 3/2007 | Dewitt, Jr. | |
| 2007/0055671 A1 | 3/2007 | Bengel et al. | |
| 2007/0150520 A1 | 6/2007 | Bennett et al. | |
| 2008/0016110 A1 | 1/2008 | Grossman et al. | |
| 2008/0062885 A1 | 3/2008 | Moon et al. | |
| 2008/0065680 A1 | 3/2008 | Moon et al. | |
| 2008/0201290 A1* | 8/2008 | Ponmudi | G06F 17/30306 707/999.001 |
| 2009/0119302 A1* | 5/2009 | Palmer | G06F 17/30368 707/999.01 |
| 2009/0172020 A1* | 7/2009 | Kernke | G06F 17/248 707/999.107 |
| 2009/0193420 A1* | 7/2009 | Ayars | G06F 17/30377 718/101 |
| 2009/0216809 A1 | 8/2009 | Horii et al. | |
| 2010/0070536 A1 | 3/2010 | Merritt | |
| 2011/0218983 A1* | 9/2011 | Chaney | G06F 17/30752 707/705 |
| 2011/0320972 A1 | 12/2011 | Marum et al. | |
| 2012/0072464 A1 | 3/2012 | Cohen | |
| 2012/0185449 A1 | 7/2012 | Gould et al. | |
| 2012/0203736 A1 | 8/2012 | Marum et al. | |
| 2013/0024422 A1 | 1/2013 | Suresh et al. | |
| 2013/0103990 A1 | 4/2013 | Hopper | |
| 2013/0198145 A1 | 8/2013 | Avery et al. | |
| 2013/0311479 A1 | 11/2013 | Bhatt et al. | |

OTHER PUBLICATIONS

Barroso et al., "Enhanced Batch Updates on Records and Related Records System and Method," U.S. Appl. No. 14/626,030, filed Feb. 19, 2015, not yet published/not enclosed, "For examiners eyes only,".

Barroso et al., "Automatic Detection of Problems in a Large-Scale Multi=Record Update System and Method," U.S. Appl. No. 14/459,664, filed Aug. 14, 2014, not yet published/not enclosed, "for examiners eyes only,".

Barroso et al., "Automatic Detection of Problems in a Large-Scale Multi-Record Update System Method," U.S. Appl. No. 14/701,845, filed May 1, 2015, not yet published/not enclosed,"for examiners eyes only,".

Anonymous, "Simplified view to increase usability and ease-of-use when performing multirecord update(s) on objects", IP.com, IPCOM000230848D, Sep. 15, 2013, 5 pages.

Anonymous, "Method and System for Fixing Errors during Batch Updates in a Grid", IP.com, IPCOM000233758D, Dec. 19, 2013, 4 pages.

* cited by examiner

ENHANCED BATCH UPDATES ON RECORDS AND RELATED RECORDS SYSTEM AND METHOD

BACKGROUND

Various kinds of data repositories may manage their content in multiple forms, such as records. A record may generally be described as, e.g., a collection of individual data fields, which may be of different types. For example, the records may represent bug reports and may include information about how to reproduce the bug, what version of the product in which the bug was found, how serious the bug is, etc. A record of this type may include fields that identify a feature or component that has the bug, a developer who may work on fixing the bug, what future release of the product may get the fix, etc.

Records may also have relationships to other records. For instance, records of one type could have relationships with other records of the same type. For example, a bug report may have a list of related bug reports. Relationships may also include records of different types. For example, a bug report may be planned to be fixed in a certain "iteration", where the iteration itself may be a type of record. In the example, custom workflows may be defined to match desired business practices. For instance, the system may require that a record have certain fields set before it may be saved or moved to a new state. The same changes may be made to more than one record.

BRIEF SUMMARY OF DISCLOSURE

In one implementation, a method, performed by one or more computing devices, may include but is not limited to receiving, by a computing device, a selection of a set of records to edit in a multi-record update operation. A selection may be received of at least one record of the set of records on which to capture one or more changes. At least one aspect of the at least one record of the set of records may be captured. The at least one aspect may be played back on one or more remaining records of the set of records.

One or more of the following features may be included. Capturing the at least one aspect of the at least one record of the set of records may include capturing at least one aspect of at least one related record that is related to the at least one record of the set of records. The at least one record of the set of records may include a template record. The at least one aspect may include a change to the template record. The at least one aspect may include an action performed on the template record. Playing back the at least one aspect on one or more remaining records of the set of records may include playing back the at least one aspect of the at least one related record. The at least one aspect on the one or more remaining records of the set of records may be played back in a same order in which each aspect is captured.

In another implementation, a computing system includes a processor and a memory configured to perform operations that may include but are not limited to receiving a selection of a set of records to edit in a multi-record update operation. A selection may be received of at least one record of the set of records on which to capture one or more changes. At least one aspect of the at least one record of the set of records may be captured. The at least one aspect may be played back on one or more remaining records of the set of records.

One or more of the following features may be included. Capturing the at least one aspect of the at least one record of the set of records may include capturing at least one aspect of at least one related record that is related to the at least one record of the set of records. The at least one record of the set of records may include a template record. The at least one aspect may include a change to the template record. The at least one aspect may include an action performed on the template record. Playing back the at least one aspect on one or more remaining records of the set of records may include playing back the at least one aspect of the at least one related record. The at least one aspect on the one or more remaining records of the set of records may be played back in a same order in which each aspect is captured.

In another implementation, a computer program product resides on a computer readable storage medium that has a plurality of instructions stored on it. When executed by a processor, the instructions cause the processor to perform operations that may include but are not limited to receiving a selection of a set of records to edit in a multi-record update operation. A selection may be received of at least one record of the set of records on which to capture one or more changes. At least one aspect of the at least one record of the set of records may be captured. The at least one aspect may be played back on one or more remaining records of the set of records.

One or more of the following features may be included. Capturing the at least one aspect of the at least one record of the set of records may include capturing at least one aspect of at least one related record that is related to the at least one record of the set of records. The at least one record of the set of records may include a template record. The at least one aspect may include a change to the template record. The at least one aspect may include an action performed on the template record. Playing back the at least one aspect on one or more remaining records of the set of records may include playing back the at least one aspect of the at least one related record. The at least one aspect on the one or more remaining records of the set of records may be played back in a same order in which each aspect is captured.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
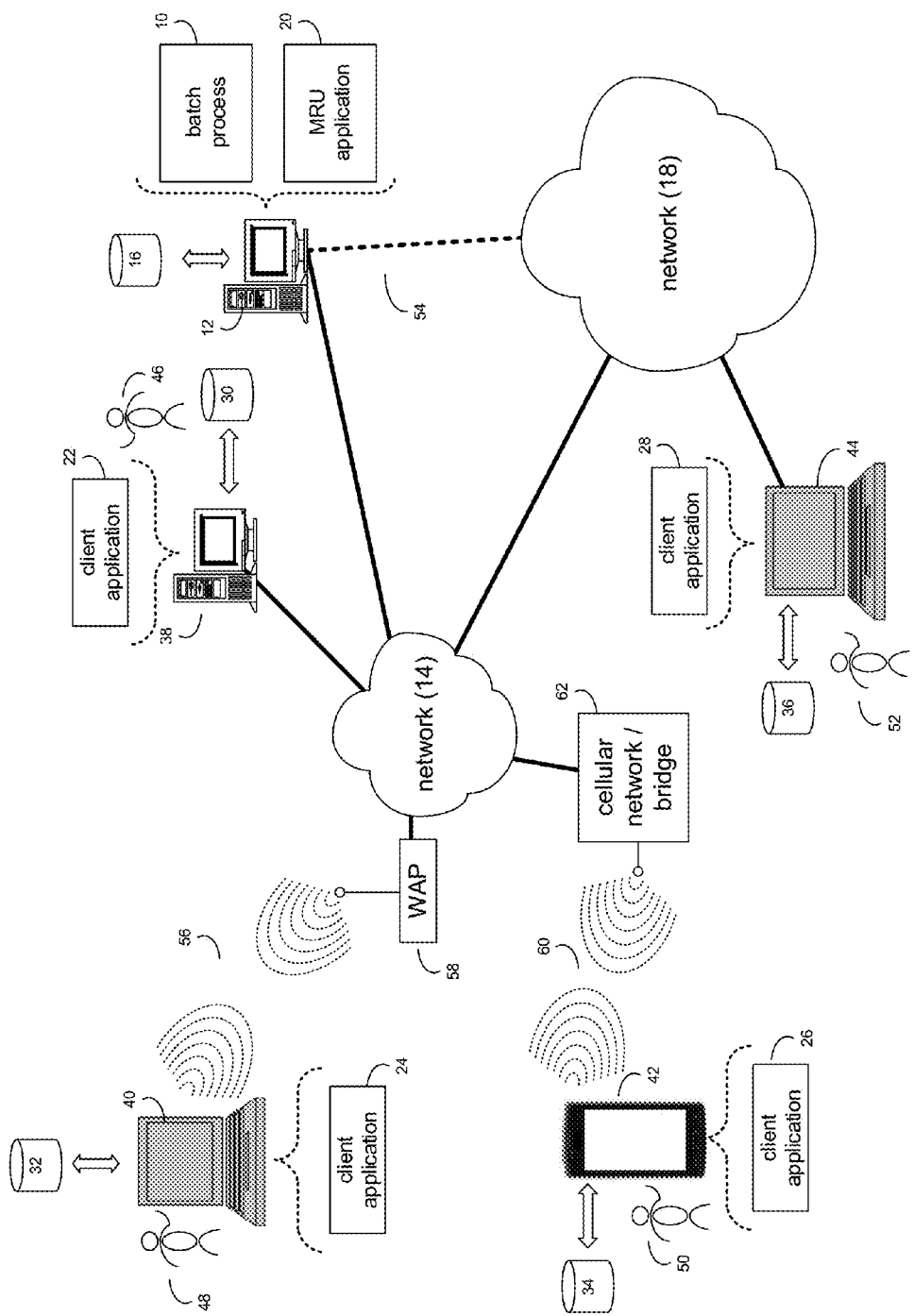
FIG. 1 is an illustrative diagrammatic view of a batch process coupled to a distributed computing network according to one or more implementations of the present disclosure.

System Overview:

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to FIG. 1, there is shown batch process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, batch process 10 may receive, by a computing device, a selection of a set of records to edit in a multi-record update operation. A selection may be received of at least one record of the set of records on which to capture one or more changes. At least one aspect of the at least one record of the set of records may be captured. The at least one aspect may be played back on one or more remaining records of the set of records.

The instruction sets and subroutines of batch process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Computer 12 may include a data store, such as a database (e.g., relational database, object-oriented database, triple-store database, etc.) and may be located within any suitable memory location, such as storage device 16 coupled to computer 12. Any data described throughout the present disclosure may be stored in the data store. In some implementations, computer 12 may utilize a database management system such as, but not limited to, "My Structured Query Language" (MySQL®) in order to provide multi-user access to one or more databases, such as the above noted relational database. The data store may also be a custom database, such as, for example, a flat file database or an XML database. Any other form(s) of a data storage structure and/or organization may also be used. Batch process 10 may be a component of the data store, a stand alone application that interfaces with the above noted data store and/or an applet/application that is accessed via client applications 22, 24, 26, 28. The above noted data store may be, in whole or in part, distributed in a cloud computing topology. In this way, computer 12 and storage device 16 may refer to multiple devices, which may also be distributed throughout the network.

Computer 12 may execute a multi-record update (MRU) application (e.g., MRU 20), examples of which may include, but are not limited to, e.g., a batch editing application, a batch triage application, or other application that allows for batch editing and/or updating. Batch process 10 and/or MRU application 20 may be accessed via client applications 22, 24, 26, 28. Batch process 10 may be a stand alone application, or may be an applet/application/script/extension that may interact with and/or be executed within MRU application 20, a component of MRU application 20, and/or one or more of client applications 22, 24, 26, 28. MRU application 20 may be a stand alone application, or may be an applet/application/script/extension that may interact with and/or be executed within batch process 10, a component of batch process 10, and/or one or more of client applications 22, 24, 26, 28. One or more of client applications 22, 24, 26, 28 may be a stand alone application, or may be an applet/application/script/extension that may interact with and/or be executed within and/or be a component of batch process 10 and/or MRU application 20. Examples of client applications 22, 24, 26, 28 may include, but are not limited to, e.g., a batch editing application, a batch triage application, or other application that allows for batch editing and/or updating, a standard and/or mobile web browser, an email client application, a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

One or more of client applications 22, 24, 26, 28 may be configured to effectuate some or all of the functionality of batch process 10 (and vice versa). Accordingly, batch process 10 may be a purely server-side application, a purely client-side application, or a hybrid server-side/client-side application that is cooperatively executed by one or more of client applications 22, 24, 26, 28 and/or batch process 10.

One or more of client applications 22, 24, 26, 28 may be configured to effectuate some or all of the functionality of MRU application 20 (and vice versa). Accordingly, MRU application 20 may be a purely server-side application, a purely client-side application, or a hybrid server-side/client-side application that is cooperatively executed by one or more of client applications 22, 24, 26, 28 and/or MRU application 20. As one or more of client applications 22, 24, 26, 28, batch process 10, and MRU application 20, taken singly or in any combination, may effectuate some or all of the same functionality, any description of effectuating such functionality via one or more of client applications 22, 24, 26, 28, batch process 10, MRU application 20, or combination thereof, and any described interaction(s) between one or more of client applications 22, 24, 26, 28, batch process 10, MRU application 20, or combination thereof to effectuate such functionality, should be taken as an example only and not to limit the scope of the disclosure.

Users 46, 48, 50, 52 may access computer 12 and batch process 10 (e.g., using one or more of client electronic devices 38, 40, 42, 44) directly through network 14 or through secondary network 18. Further, computer 12 may be connected to network 14 through secondary network 18, as illustrated with phantom link line 54. Batch process 10 may include one or more user interfaces, such as browsers and textual or graphical user interfaces, through which users 46, 48, 50, 52 may access batch process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi®, and/or Bluetooth™ device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
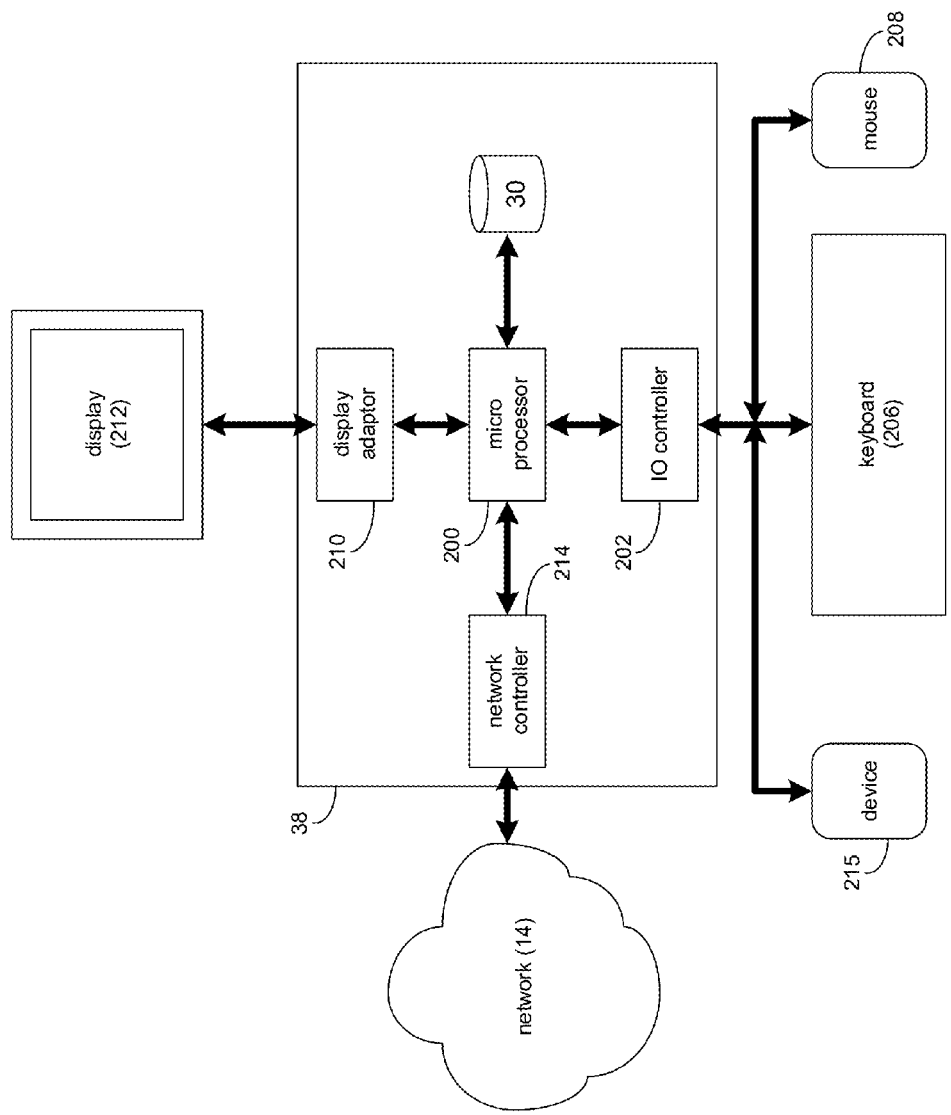
FIG. 2 is a diagrammatic view of a client electronic device of FIG. 1 according to one or more implementations of the present disclosure.

Referring also to FIG. 2, there is shown a diagrammatic view of client electronic device 38. While client electronic device 38 is shown in this figure, this is for illustrative purposes only and is not intended to be a limitation of this disclosure, as other configurations are possible. For example, any computing device capable of executing, in whole or in part, batch process 10 may be substituted for client electronic device 38 within FIG. 2, examples of which may include but are not limited to computer 12 and/or client electronic devices 40, 42, 44.

Client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device(s) (e.g., storage device 30). An I/O controller (e.g., I/O controller 202) may be configured to couple microprocessor 200 with various devices, such as keyboard 206, pointing/selecting device (e.g., mouse 208), custom device (e.g., device 215), USB ports (not shown), and printer ports (not shown). A display adaptor (e.g., display adaptor 210) may be configured to couple display 212 (e.g., CRT or LCD monitor(s)) with microprocessor 200, while network controller/adaptor 214 (e.g., an Ethernet adaptor) may be configured to couple microprocessor 200 to the above-noted network 14 (e.g., the Internet or a local area network).

Various kinds of data repositories may manage their content in multiple forms, such as records. A record may generally be described as, e.g., a collection of individual data fields, which may be of different types. For example, the records may represent bug reports and may include information about how to reproduce the bug, what version of the product in which the bug was found, how serious the bug is, etc. A record of this type may include fields that identify a feature or component that has the bug, a developer who may work on fixing the bug, what future release of the product may get the fix, etc.

Records may also have relationships to other records. For instance, records of one type could have relationships with other records of the same type. For example, a bug report may have a list of related bug reports. Relationships may also include records of different types. For example, a bug report may be planned to be fixed in a certain "iteration", where the iteration itself may be a type of record. In the example, custom workflows may be defined to match desired business practices. For instance, the system may require that a record have certain fields set before it may be saved or moved to a new state.

The same changes may be made to more than one record. For example, the process of reviewing new bug report records and assigning them to a developer or future release may be described broadly as "triage". During a triage session, more than one bug report record may have the same disposition, particularly for the future release where it may be fixed. As an example to make the change to those bug reports, the developer performing the triage may like to set the future release in one record and have that same change be made to some number of other records. Such a change may be described broadly as batch editing or a multi-record update (MRU).

Some example techniques may be used for performing multi-record updates. For example, some techniques may make changes to many records based on a recording of changes made directly on a single record (e.g., a template record). However, it may be necessary sometimes to record changes on related records and play those back as well. For example, consider a defect tracking system with a variety of related record types. An example MRU application 20 that may implement a defect tracking system is IBM Rational ClearQuest, a flexible change tracking tool that may be configured to function as a defect tracking system for software development. MRU application 20 may define different record types, assign relationships and state models to customize the workflow. The example defect tracking system of MRU application 20 may define user interfaces (e.g., forms) for submitting and modifying defect records. The example defect records may have fields like, e.g., (1) headline—a short one-line description of the defect, (2) description—a longer description of the defect including steps on how to reproduce it (3) severity—how bad the defect is, (4) priority—how important it is to fix it, (5) owner—the developer who will work on it.

Consider an example defect tracking system associated with MRU application 20, where a defect record may have one or more records that track actual work done to resolve the defect. These record types are generally called an Activity. The Activity record may have a data field called "ScheduledFor" that may represent when in the schedule it should be performed, e.g., "Iteration 15". A defect may have more than one Activity if, e.g., more than one developer was working on it, or if they had to rework the original solution to the problem. Thus, if a developer wanted to work on a defect in a certain iteration, they may use a user interface associated with MRU application 20 to enter an input (e.g., click a "StartWork" button on the defect form). This "StartWork" button may enable a pop up window form that may enable the user to create a new Activity record. The form may have some values already populated in it to make it easier for the user. For example, if the Defect was assigned to Bob the Engineer, then the Activity may, by default, be assigned to Bob as well. Bob may still have to decide which iteration to schedule it for, so Bob may select "Iteration 15" from the Activity form and click "Save". The new Activity may be created, scheduled for "Iteration 15", and may be linked to the defect record for which the work may be done. Thus, when viewing the defect, the user may see that it has a list of Activity records indicating work that was actually done to resolve the defect.

A common task for software teams may be triage or activity planning. The teams may meet to decide which defect records to work on for a given iteration. In the example given above, the teams may decide which defect records they want to work on in "Iteration 15", set them to "high" priority, and then create an Activity record associated with each defect record and set the ScheduledFor value on the Activity records to "Iteration 15". MRU application 20 may capture changes made in one form and play those back on additional records in the selection. However, other examples of MRU applications may only allow the user to capture changes on one record, and play those back against one record at a time, and not allow the user to capture changes across related records. For example, if the user wanted to capture the above-noted operation, the user may need to capture both the changes to the defect (e.g., setting priority to "high") and any field values set in the Activity you create (such as "ScheduledFor").

When performing an MRU on systems where there may be significant customized workflow (e.g., business logic), users may be more interested in performing utility actions on records rather than just making changes to data fields. For example, a utility action may be a customized business function (e.g., written by the owner/administrator of the MRU application) that is executed on the record. They may be defined as scripts for the business practices and run when the user edits the record and clicks on a "Run" button of an associated user interface. While recording changes on records and related records, the teams may want to record any utility actions run as those "Run" buttons are clicked (or otherwise selected). Due to their scripted nature, they may have a different affect on each record on which it runs, as the actual changes may depend on the record's current state and field values, or it may depend on some external conditions. For example, a utility action may be defined to find the developer with the lowest workload and assign the Activity to that person. Often, these utility actions may be combined with other field changes on the record. For example, during a defect triage process, a team member may (1) assign a defect to be fixed in the next version of the product, (2) create an Activity on the defect and assign it to the current iteration, and (3) run a utility action on the Activity, which may find the developer with the lowest workload.

As will be described in greater detail below, for change management systems (e.g., MRU application 20) with a customized workflow, it may be (in some implementations) necessary to make changes in a particular order. For example, setting a 'project' field in a defect may allow certain developers to be set as 'owner'. When playing back the changes, MRU application 20 may set the 'project' field first before setting the 'owner' field. Even if MRU application 20 possessed a utility action that will set several required fields automatically, the user may still be required to set the iteration first. During play back, MRU application 20 may set the iteration first then perform the action. The order in which the user performs the actions on the template record will also be the order in which the changes and actions are played back. This additional data about the order of changes and actions may be preserved and used during play back. That is, it may not be enough to just record an unordered set of changes and buttons.

Figure 3:
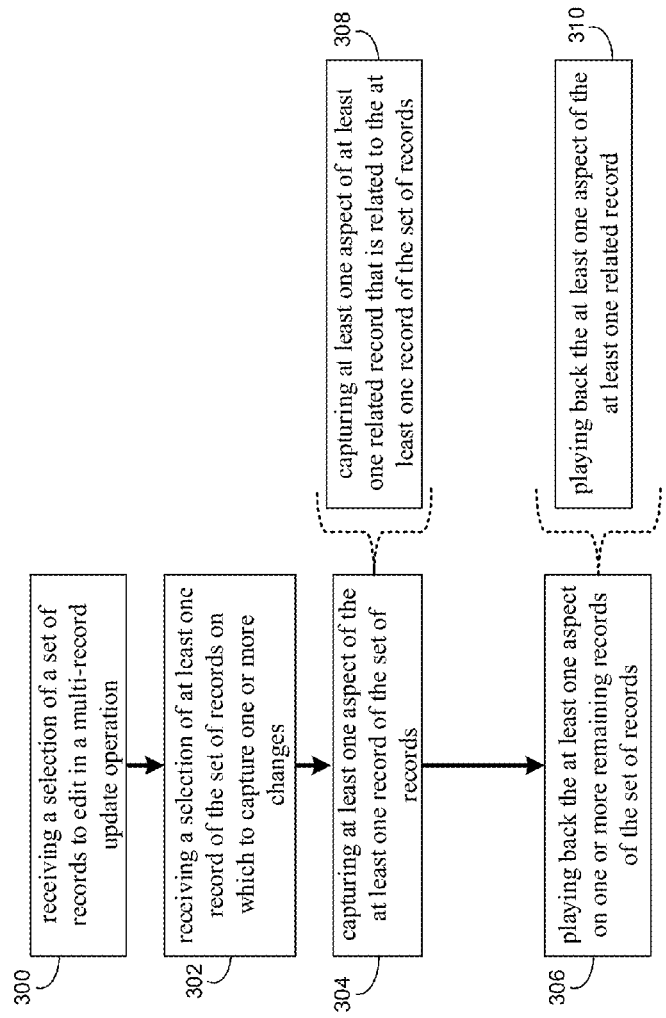
FIG. 3 is an illustrative flowchart of the batch process of FIG. 1 according to one or more implementations of the present disclosure.
Figure 4:
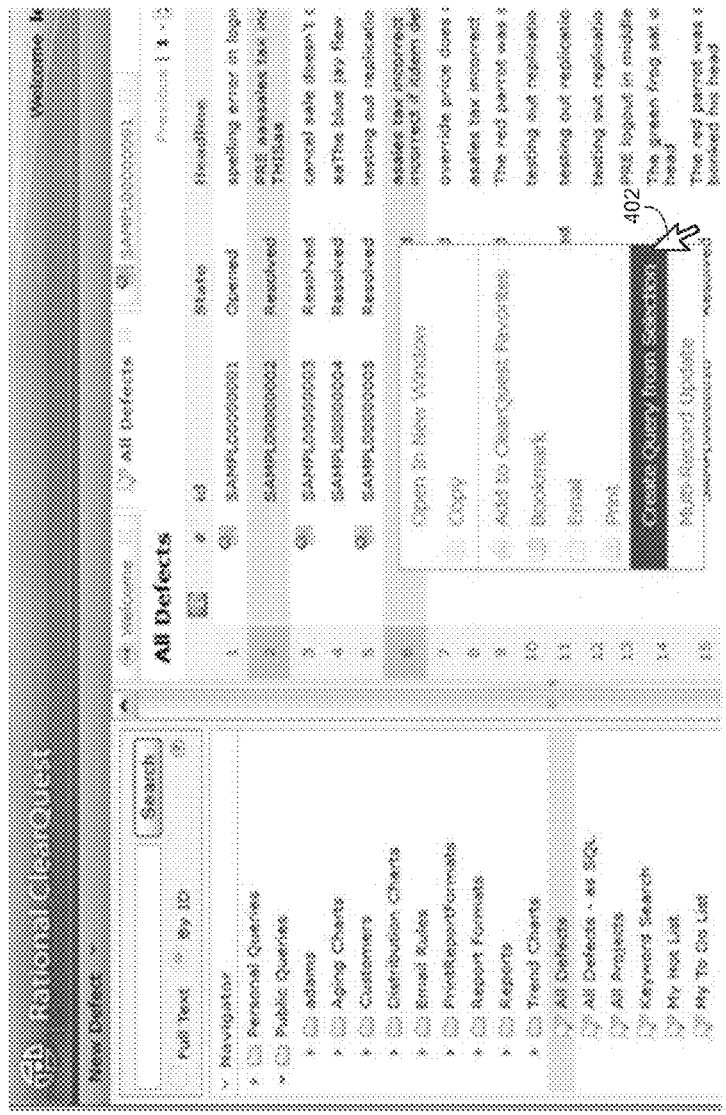
FIG. 4 is an illustrative diagrammatic view of a screen image displayed by the batch process of FIG. 1 according to one or more implementations of the present disclosure.
Figure 5:
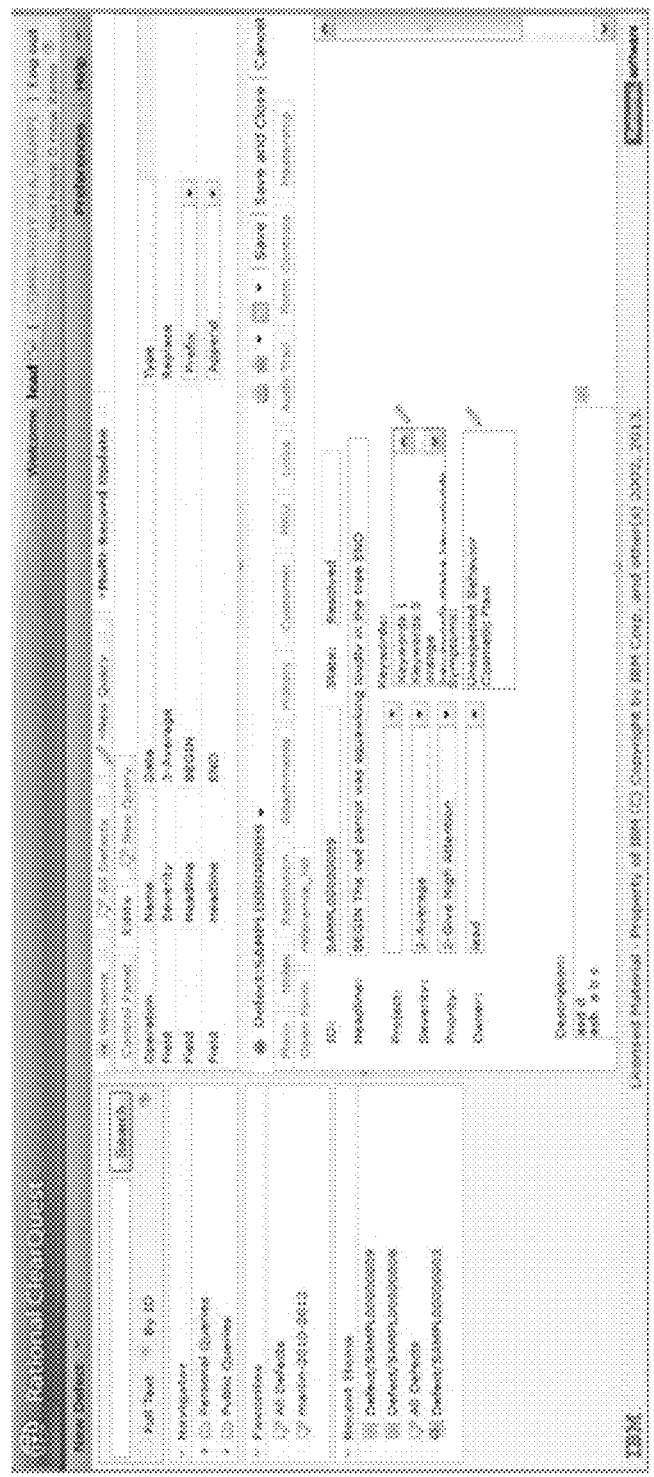
FIG. 5 is an illustrative diagrammatic view of a screen image displayed by the batch process of FIG. 1 according to one or more implementations of the present disclosure.

The Batch Process:

As discussed above and referring also to FIGS. 3-5, batch process 10 may receive 300, by a computing device, a selection of a set of records to edit in a multi-record update operation. Batch process 10 may receive 302 a selection of at least one record of the set of records on which to capture one or more changes. At least one aspect of the at least one record of the set of records may be captured 304 by batch process 10. Batch process 10 may play back 306 the at least one aspect on one or more remaining records of the set of records.

As noted above, in some implementations, batch process 10 may receive 300, by a computing device (e.g., client electronic device 38), a selection of a set of records to edit in a multi-record update operation. For instance, assume for example purposes only that a user (e.g., user 46) is utilizing a user interface (e.g., user interface 400) associated with batch process 10, MRU application 20, client application 22, or combination thereof. In the example, batch process 10 may operate on some or all records on a display page of a result set (shown in FIG. 4). Further in the example, user 46 may (e.g., via batch process 10) create a query that selects just the records desired for MRU application 20 (e.g., using tags, keywords, normal query filters to select desired records, etc.), and/or use a pointing device (e.g., cursor 402) to select a subset of records from an existing query, and create a query from the selection to obtain a new result set with the above-noted received 300 selections.

In some implementations, batch process 10 may receive 302 a selection of at least one record of the set of records on which to capture one or more changes. For example, the at least one record of the set of records may include a template record. For example, in some implementations, as will be discussed in greater detail below, a change made to many records by batch process 10 may be based on a recording of one or more changes made directly on a single record (e.g., a template record). The recording of the one or more changes may include an indication of the one or more changes that are made on the single record, and may include an indication of a sequence, order, or timing (e.g., either relative or absolute) in which the changes are made. An example template record 500 from user interface 400 is shown in example FIG. 5.

In some implementations, at least one aspect of the at least one record of the set of records may be captured 304 by batch process 10. For example, as will be discussed below, in some implementations, the at least one aspect may include a change to template record 500, and the at least one aspect may include an action performed on template record 500. An action (e.g., a utility action) may include a customized business function (e.g., written by the owner/administrator of MRU application 20) that may be executed on the record. They may be defined as scripts for the business practices and run when the user edits the record and uses a mouse (or other pointing device) to click on a "Run" button. For instance, any aspects (e.g., change and/or action) performed on the above-noted user-interface 400 to edit template record 500 may be captured 304 or recorded by batch process 10. This may include changes to, e.g., field values, and any actions that may be performed as a result of received user-inputs (e.g., mouse button clicks). It will be appreciated that the button need not say "Run", and it will also be appreciated that other types of user interface objects and/or commands may be used in place of the "Run" button. In some implementations, if a field is changed multiple times, each edit may be recorded separately. For example, if user 46 types in a keyword, then uses a mouse to click "add", then types in a new keyword and clicks "add" again, then batch process 10 may capture 304 or record "keyword edit, add, keyword edit, add." These changes and actions may be captured 304 in a single object of data containing information about the change or action and the order of these changes. The captured 304 aspects may be stored in, e.g., an array, which may look like the below example:

```
CapturedChanges = [
    {begin_action},
    {operation 1},
    {operation 2},
    {operation 3},
    ....
    {operation n}
]
```

The nodes in CapturedChanges are described below:

begin_action—The begin_action node may describe any "important" information that may be necessary for batch process 10 to start editing the record(s). In some implementations, batch process 10 may define certain actions user 46 may take to begin editing a record. For example, batch process 10, which may support records that have state-models, may enable user 46 to define a modify action type and state-transition action types. In some implementations, until any of these actions are run, the records may not be editable. The modify action types may make the record editable. The state-transition action types may change the record's state and then may make the records editable. The begin_action node may have this example data:

```
operation = [
    type: begin_action,
    action_id
]
``` operation: field—The "operation" entries may define either a field change or other action taken in the record's form. For example a field change on template record 500 may have this example data:

```
operation = [
    type: field_edit,
    field_id, /* e.g. "headline" */
    old_value, /* e.g. "The user cannot modify the record" */
    new_value, /* e.g. "[STOPSHIP] The user cannot modify the record" */
    change_datum, /* e.g. "[STOPSHIP] "
    change_type /* e.g. "prefix".... could also be replace, append, etc*/
]
```

Batch process 10 may define many change types that may be available for a field.

operation: utility action—An "operation" entry may also be a utility action (e.g., button click) on template record 500 and may have the following example data:

```
operation = [
    type: utility_action,
    utility_action_id /* identifier for the utility action to run on the record
    */
]
```

In some implementations, there may be one related record for each record for a particular MRU operation. In some implementations, MRU application 20 may capture 304 changes from one or more related records, and a given MRU, with many recorded operations, may have many related records. As will be discussed below, an operation on a related record may itself have operations on nested related records. In some implementations, capturing 304 the at least one aspect of the at least one record of the set of records may include batch process 10 capturing 308 at least one aspect of at least one related record that is related to the at least one record of the set of records. For example:

operation: new related record—This "operation" may specify creation of a new related record. For instance, batch process 10 may enable records to have links to other related records. For example, a "Defect record" may have one or more "Activity records". A record may be linked by batch process 10 to other records using, e.g., a special field that may contain one or more references to other records. For example, the field may have a single-reference field that may link to only one record, or the field may have a reference list field that may link to one or more records. In some implementations, batch process 10 may enable user 46 to create a new related record by, e.g., clicking on a user interface button on a form that creates the new record. For example, there may be a user interface button, "Create Activity", which may create a new Activity record.

If user 46 chooses to create a new related record, then a new form may be rendered (e.g., via a pop up window) and display a form user 46 may typically see when creating that record. User 46 may make changes and perform actions on this form just as was done on template record 500 form. In some implementations, the pop up window may be modal (i.e., will not allow editing to template record 500 until saving the new record). The changes and actions captured to the fields of this new record may be recorded just like they are for template record 500, except these changes may be captured 308 inside a single operation block in an embedded CapturedChanges, e.g.:

```
operation = [
    type: new_related_record,
    new_record_action_id, /* identifier for the action to create the related record */
    pause_after_create,
    CapturedChanges for new record
]
```

In the example, the new_record_action_id attribute may specify an action that batch process 10 may run when creating the new record. This may be a customized utility action that may be done to prepare the record before its related record may be created. Note CapturedChanges may also have a begin_action for the new record, and this may be different from the new_record_action_id. This may be the action that begins the creation of the record. Batch process 10, for example, may enable user 46 to define multiple submit actions for a given record. The submit action used to create the record may be captured 304 to ensure proper play back 306/308 (discussed in greater detail below).

The pause_after_create attribute may be a boolean type field that may specify whether the play back 306 should pause after the record is created but before it is saved. In some implementations, if it is set to pause on create, batch process 10 may present the record form with the new record in it, allowing user 46 to check that it is correct and/or make additional changes to the record before it is saved by batch process 10. In the example, if this is false, then there may be no pause and the records may be created and saved without user interaction.

In some implementations, playing back 306 the at least one aspect on one or more remaining records of the set of records may include batch process 10 playing back 310 the at least one aspect of the at least one related record. In some implementations, there may be one or more related records for each record for the MRU operation, and an operation may be on related records. In an embodiment, playing back 306 the at least one aspect on the one or more remaining records may generally include implementing the one or more recorded changes on the one or more remaining records. In some embodiments, playing back 306 the at least one aspect may include implementing the one or more recorded changes in the order or sequence in which the changes were made. For example:

operation: modify related record—To edit a related record, user 46 may (via batch process 10) right-click on a reference field value in template record 500 form and choose "Edit" from the menu. The menu may be configured by batch process 10 to have multiple items to specify different edit actions (e.g., allowing user 46 to choose one of many different actions to start editing). For example, the actions may include "Modify", "Assign", "Postpone", etc. When user 46 chooses the action, a record form may pop up (e.g., via a pop up window) for that related action and allow user 46 (via batch process 10) to edit the record. In the example, similarly as noted above, the form may be modal, thus preventing edits on template record 500 until the related record is saved. In the example, the changes and actions to the related record may be captured 308 in a similar manner as noted above, including the begin_action used to start the edit. In some implementations, there may be two additional pieces of information to capture, and that may include, e.g., which field the referenced record is linked to, and which reference to play 306 the changes back on.

```
operation = [
  type: modify_related_record,
  field_id, /* field which holds the reference to the related record being edited */
  which_reference, /* which reference to modify */
  pause_on_modify, /* whether to pause after each modify */
  CapturedChanges for new record
]
```

The which_reference attribute may be used to tell batch process 10 which reference in the field to operate on. For fields that only allow one reference, the value may be ignored. For fields that may have multiple references, such as reference list type fields, then this value may have one of the following example values:

first_reference—The first reference in the list may be modified last_reference—The last reference in the list may be modified all_references—All references in the list may be modified manually_choose—During play back 306, the user may be given a choice on which reference or references to have batch process 10 play 306 the changes back on.

Batch process 10 may try to automatically detect what user 46 wants, but may allow the user to change this before the play back 306 begins. If the related record edited in the field is the first reference, then first_reference may be chosen. If it is the last reference, then last_reference may be chosen. If it is in the middle, then which_reference may be set to manually_choose. These defaults may make batch process 10 more usable, as it may interpret what user 46 may want, so that user 46 need not have to re-configure play back 306.

In some implementations, the CapturedChanges in the above-noted defined operations may themselves have subsequent 'new' or 'modify related record' nodes, and thus, there may be unlimited nested operations on related records.

In some implementations, batch process 10 may play back 306 the at least one aspect on one or more remaining records of the set of records. In some implementations, before play back 306, batch process 10 may enable user 46 with the ability to adjust how play back 306 occurs. For example, user 46 may specify whether to pause_on_create for "new_related_record" or pause_on_modify for "modify_related_record" type operations. User 46 may change how field operations are performed by batch process 10. For example, user 46 (via batch process 10) may change the performance from "replace" to "append", and may change the value on the modify_related_records operations.

In some implementations, the at least one aspect on the one or more remaining records of the set of records may be played back 306 in a same order in which each aspect is captured. For instance, assume user 46 is satisfied with the captured 304/308 changes and how they may be played back, and thus selects to have batch process 10 begin the play back 306. In some implementations, when play back 306 occurs, all the operations recorded in the top level CapturedChanges (as well as changes on related records) may be played back 306 in the exact same order on every record. This may ensure that changes and actions are played back in the correct order for the custom workflow of batch process 10. The begin_action operation may start the edit process on the record. Then, each operation node may be executed on the record. In the example, if it is a field operation, then the value of the field may be altered accordingly by batch process 10. For example, if it is an APPEND operation, the change_datum text may be appended to the field's current value. If the operation is a utility action, then the action may be executed on the record.

In the example, if the operation node is for creating a new related record, then the utility action specified by new_record_action_id may be executed first. Then, the embedded CapturedChanges in this node may be used to create the new record (including the begin_action which may be a submit action) and they may be played back against this new record. In the example, if the pause_after_create is set to true, then before this new record is saved, a new form may be displayed to user 46 with the new record data in it. User 46 may then have a chance (via batch process 10) to check the record for any errors, or to make further changes on the record. When batch process 10 receives an input from user 46 (e.g., clicking "Save" on the form), batch process 10 may save the record and continue with the play back 306.

In the example, if the operation node is for modifying an existing record, then the record to be modified by batch process 10 may be determined using, e.g., the field_id and the above-noted values on the operation node. If first_reference or last_reference is specified, then the first or last reference in the field list may be used by batch process 10, respectively. If all_references is specified, then all references in the field may be used by batch process 10. If manually_choose is specified, then play back 306 may be paused and a list of references in the field may be presented to user 46, where user 46 (via batch process 10) may be asked to choose which references to modify in the operation. Once user 46 chooses which references to act on, the play back 306 may continue.

Once the selection of the record (or list of records) is chosen and received by batch process 10, then batch process 10 may perform the actions on the record in the embedded CapturedChanges. In some implementations, batch process 10 may start by running the begin_action and may then follow by running all the operations. In the example, if pause_on_modify is set, then the play back 306 may be paused after all the actions and changes in the embedded CapturedChanges are played back, but before it is saved. A form may pop up (e.g., a pop up window via the above-noted user interface 400) showing the modified record and may allow user 46 to check the values and perform additional modifications. When batch process 10 receives an input by user 46 (e.g., clicking "Save" on the modified related record form), then play back 306 may continue.

In the example, if the field_id corresponds to a reference list field and the which_reference attribute is set to all_references or manually_choose (e.g., with multiple references chosen by user 46), then the embedded CapturedChanges may be played back 306 against each of those referenced records. If pause_on_modify is chosen, batch process 10 may pause on each related record modified in this operation.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, and combinations thereof) are possible without departing from the scope of the disclosure defined in the appended claims.

What is claimed is:

1. A computer program product residing on a computer readable storage medium having a plurality of instructions stored thereon which, when executed by a processor, cause the processor to perform operations comprising:
   receiving a selection of a set of records to edit in a multi-record update operation;
   receiving a selection of at least one record of the set of records on which to capture one or more changes, wherein the at least one record includes a field having a link that references the set of records as being related;
   capturing a plurality of aspects of the at least one record of the set of records, wherein capturing the plurality of aspects of the at least one record of the set of records includes capturing a plurality of aspects of at least one related record that is related to the at least one record of the set of records via the field having the link that references the set of records as being related; and
   playing back the plurality of aspects on the remaining records of the set of records with the field having the link that references the set of records as being related, wherein playing back the plurality of aspects on one or more remaining records of the set of records includes playing back the plurality of aspects of the at least one related record, wherein the plurality of aspects on the one or more remaining records of the set of records is played back in each field on the one or more remaining records in a same order in which each aspect is captured in each field on a template record, wherein at least one aspect of the plurality of aspects includes an action including a customized business function executed on the template record and captured in a single object of data containing information about the action and order in which one or more actions occur.

2. The computer program product of claim 1 wherein the at least one record of the set of records includes a template record.

3. The computer program product of claim 2 wherein the at least one aspect includes a change to the template record.

4. The computer program product of claim 2 wherein the plurality of aspects includes at least one action performed on the template record.

5. A computing system including a processor and a memory configured to perform operations comprising:
   receiving a selection of a set of records to edit in a multi-record update operation;
   receiving a selection of at least one record of the set of records on which to capture one or more changes, wherein the at least one record includes a field having a link that references the set of records as being related;
   capturing a plurality of aspects of the at least one record of the set of records, wherein capturing the plurality of aspects of the at least one record of the set of records includes capturing a plurality of aspects of at least one related record that is related to the at least one record of the set of records via the field having the link that references the set of records as being related; and
   playing back the plurality of aspects on the remaining records of the set of records with the field having the link that references the set of records as being related, wherein playing back the plurality of aspects on one or more remaining records of the set of records includes playing back the plurality of aspects of the at least one related record, wherein the plurality of aspects on the one or more remaining records of the set of records is played back in each field on the one or more remaining records in a same order in which each aspect is captured in each field on a template record, wherein at least one aspect of the plurality of aspects includes an action including a customized business function executed on the template record and captured in a single object of data containing information about the action and order in which one or more actions occur.

6. The computing system of claim 5 wherein the at least one record of the set of records includes a template record.

7. The computing system of claim 6 wherein the plurality of aspects includes a change to the template record.

\* \* \* \* \*